United States Patent
Adleman et al.

(10) Patent No.: US 12,413,314 B2
(45) Date of Patent: Sep. 9, 2025

(54) LOW DISTORTION AND PHASE NOISE OPTICAL SINGLE SIDEBAND GENERATION SYSTEM AND RELATED METHODS

(71) Applicant: Naval Information Warfare Center Pacific, San Diego, CA (US)

(72) Inventors: James R Adleman, San Diego, CA (US); David Chao, San Diego, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 384 days.

(21) Appl. No.: 18/093,895

(22) Filed: Jan. 6, 2023

(65) Prior Publication Data

US 2024/0235687 A1    Jul. 11, 2024

(51) Int. Cl.
*H04B 10/50* (2013.01)
*H04B 10/079* (2013.01)

(52) U.S. Cl.
CPC ....... *H04B 10/503* (2013.01); *H04B 10/0795* (2013.01)

(58) Field of Classification Search
CPC .............. H04B 10/503; H04B 10/0795; H04B 10/07953; H04B 10/07955; H04B 10/07957; H04B 10/07951; H04B 10/548; H04B 10/50; H04B 10/588; H04B 10/58
See application file for complete search history.

(56) References Cited

U.S. PATENT DOCUMENTS

| | | | |
|---|---|---|---|
| 5,661,439 A | | 8/1997 | Watkins et al. |
| 6,014,217 A | * | 1/2000 | Sanders ............... G01C 19/727 356/461 |
| 8,258,877 B2 | | 9/2012 | Goel et al. |
| 2016/0123720 A1 | * | 5/2016 | Thorpe ............... G01B 9/02004 356/498 |
| 2017/0099529 A1 | * | 4/2017 | Dupuis ............. H04B 10/0795 |
| 2019/0052452 A1 | * | 2/2019 | Perlmutter .............. H03L 7/093 |
| 2020/0041616 A1 | * | 2/2020 | Stochino ................. G01S 17/36 |

OTHER PUBLICATIONS

D. M. S. Johnson, J. M. Hogan, S.-w. Chiow, and M. A. Kasevich, "Broadband optical serrodyne frequency shifting," Opt. Lett. 35, 745-747 (2010).

* cited by examiner

*Primary Examiner* — Hibret A Woldekidan
(74) *Attorney, Agent, or Firm* — Naval Information Warfare Center, Pacific; Kyle Eppele; Andrew J. Cameron

(57) ABSTRACT

An optical single sideband generation system comprising a RF signal generator generates a sawtooth drive voltage with a first frequency. A laser source provides the initial optical carrier with a second frequency that is modulated by a first phase modulator. The modulation shifts the optical carrier by the amount of the first frequency, and with added phase errors due to the imperfections of the sawtooth drive. A directional coupler allows the optical carrier to be divided into the error measurement path and the error correction path. The modulated signal goes to a phase detector that measures the phase error and converts the phase error signal to a baseband electrical signal. The optical signal at the output of the second phase modulator is the desired single sideband shifted from the original carrier with the phase errors of the signal generator suppressed by the error correction feedforward path.

10 Claims, 5 Drawing Sheets

Step 401: Providing a signal generator, a laser source, first and second phase modulators, a directional coupler, and a phase detector.

Step 403: generating a first signal with the signal generator and a second signal with the laser source.

Step 405: modulating the second signal with the first signal to generate a first modulated signal with the first phase modulator.

Step 407: directing the first modulated signal to an error measurement path and an error correction path with the directional coupler.

Step 409: converting the first modulated signal into a baseband electrical signal using the phase detector within the error measurement path.

Step 411: modulating the baseband electrical signal with an error signal from error measurement path using the second phase modulator to output a sideband signal.

Fig. 4

LOW DISTORTION AND PHASE NOISE OPTICAL SINGLE SIDEBAND GENERATION SYSTEM AND RELATED METHODS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 111854) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil.

BACKGROUND OF THE INVENTION

For many radio frequency (RF) photonic applications it is desirable to be able to produce a frequency shifted replica of an original optical tone. This can be to act as a coherent phase reference, a seed or pump for a nonlinear optical process, or a local oscillator for RF conversion. Typically, coherent offset tones can be produced using optical phase locked loops, optical injection locking, external modulation of the optical carrier using either acousto-optic or electro-optic modulators, or direct current modulation of the light source. In all of these approaches, the degree of coherence between the original optical carrier and the sideband is fundamentally limited by the phase noise of the RF reference frequency which determines the offset. In many applications, the offset frequencies required are in the microwave of millimeter wave bands, and the phase noise of the RF reference at these frequencies may limit system performance. Driving an electro-optical modulator with a sawtooth wave (e.g., serrodyne modulation) to produce a pure sinusoidal modulation can produce only the desired single sideband with reduced distortion. For precise frequency control and agile tuning capability in the microwave band, the sawtooth generation should be done by direct digital synthesis, which leads to elevated phase noise at higher offset frequencies. There is a need for a system that can produce an improved quality optical single sideband with the frequency position and agility of a digital RF synthesizer.

SUMMARY OF THE INVENTION

The present invention relates to a system and method to overcome the phase noise impact of digital synthesis of an RF sawtooth wave to produce a single sideband electro-optical modulation that has improved coherence with the original optical carrier.

According to an illustrative embodiment of the present disclosure, a RF signal generator generates a sawtooth drive voltage with a first frequency. A laser source provides the initial optical carrier with a second frequency that is modulated by a first phase modulator. The modulation shifts the frequency of the optical carrier upwards by the first frequency, and with added phase errors due to the imperfections of the sawtooth drive. A directional coupler allows the optical carrier to be divided into the error measurement path and the error correction path. The modulated signal goes to a phase detector that measures the phase error and converts the phase error signal to a baseband electrical signal. The optical signal at the output of the second phase modulator is the desired single sideband shifted from the original carrier with the phase errors of the signal generator suppressed by the error correction feedforward path.

According to a further illustrative embodiment of the present disclosure, a method for generating optical single sidebands includes generating a first signal with a signal generator and a second signal with the laser source modulating the second signal with the first signal to generate a first modulated signal with the first phase modulator, directing the first modulated signal to an error measurement path and an error correction path with a directional coupler, converting the first modulated signal into a baseband electrical signal using a phase detector within the error measurement path, modulating the baseband electrical signal with an error signal from error measurement path using a second phase modulator to output a sideband signal.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which:

FIG. 4 shows an exemplary method for producing a sideband signal.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
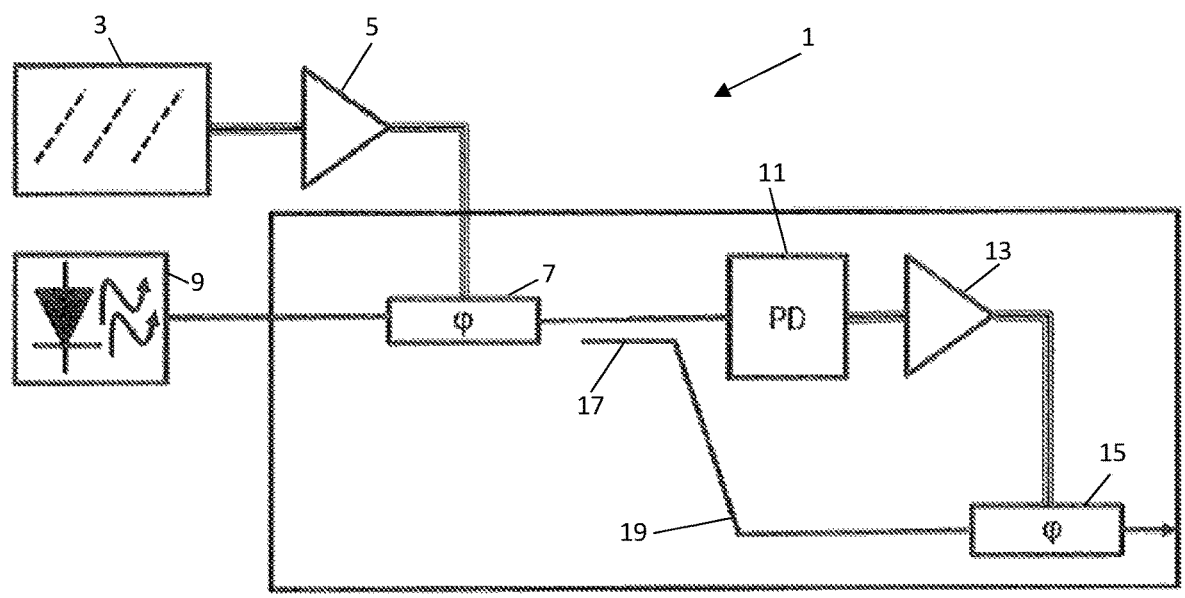
FIG. 1 shows an exemplary system architecture.

FIG. 1 shows an exemplary architecture of an optical system 1. A RF signal generator 3, such as a numerically controlled oscillator (NCO), generates the sawtooth drive voltage with a frequency $f_{rf}$. An RF amplifier 5 amplifies the drive voltage amplitude to match the full wave voltage of a first phase modulator 7, which can be integrated. A laser source 9 provides the initial optical carrier with frequency $f_o$ that is modulated by first phase modulator 7. The modulation shifts the optical carrier frequency to $f_o+f_{rf}$ and with added phase errors due to the imperfections of the sawtooth drive. The modulated signal goes to a phase detector section 11 that measures the phase error and converts the phase error signal to a baseband electrical signal with a gain of $K_{pd}$. An integrated baseband electrical amplifier 13 amplifies the signal with a gain of $-K_{bb}$. The overall gain of $-K_{bb}K_{pd}$ is designed to match the full wave voltage of a second phase modulator 15 that compensates for errors. The error signal provided to the second phase modulator creates a feedforward error compensation, ideally producing a single optical carrier shifted from the original by $f_{rf}$. A directional coupler 17 allows the optical carrier to be divided into the error measurement path and the error correction path. An optical delay line A9 is used in the correction path to delay the optical carrier and the measured error by the same amount so that they are properly synchronized at the compensating modulator. The optical signal at the output of the second phase modulator 15 is the desired single sideband shifted from the original carrier $f_{rf}$ with the phase errors of the signal generator 3 suppressed by the error correction feedforward path.

Figure 2:
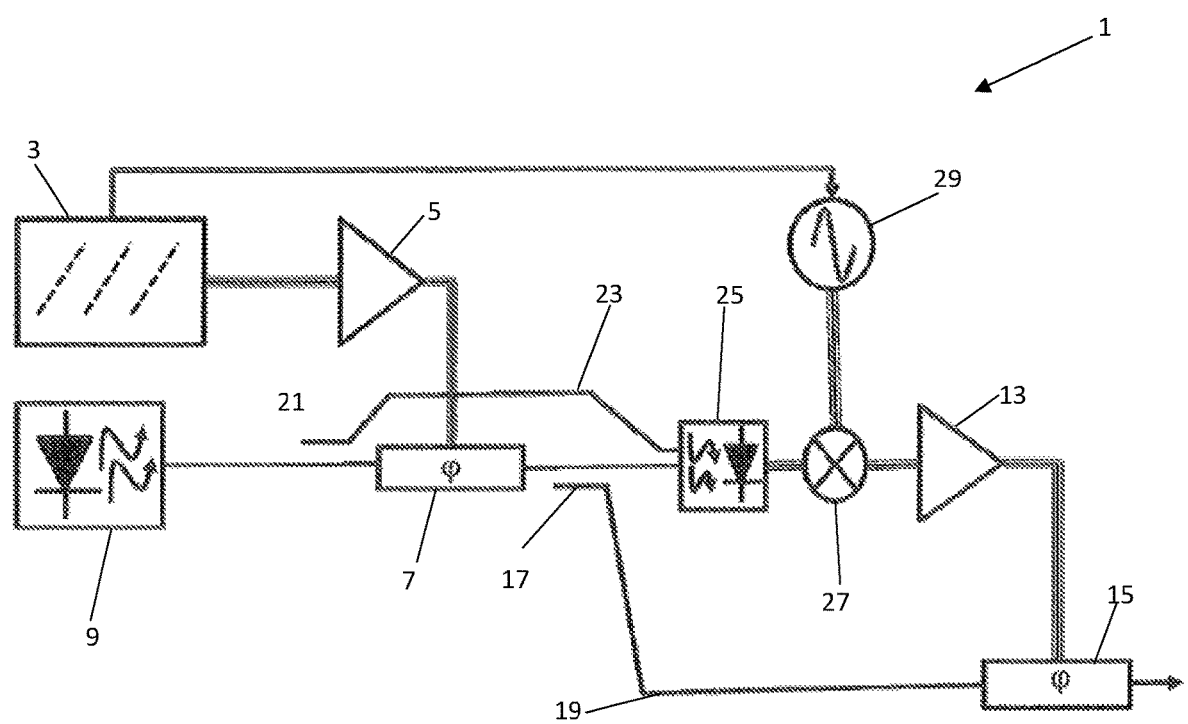
FIG. 2 shows an exemplary system architecture with a phase detector.

FIG. 2 shows an exemplary system architecture with phase detector. First and second directional couplers 21, 23 form a Mach-Zehnder interferometer (MZI) that turns phase modulated signal into an amplitude modulated sinewave at $f_{rf}$. A photodetector 25 detects the optical signal as a photocurrent. The photocurrent is mixed on an RF phase detector mixer 27 with the output of a low phase noise RF source 29. RF source 29 is locked to signal generator 3 with a phase locked loop so that the RF source's output frequency matches that of the signal generator, and the phase detector maintains quadrature condition with the nominal phase of signal generator 3.

Integrating phase error detection allows for reduced impact of environmental noise and enables feedforward correction to be implemented simply on chip. Use of feedforward correction allows for stabilization and cancellation of the phase error impairments of a digitally synthesized sawtooth drive oscillator. This avoids having to synthesize a very high quality sawtooth source, either directly or with a PLL and analog sawtooth oscillator. The architecture is able to work across a wide range of frequencies with minimal adjustment. Any frequency supported by the NCO, modulators, and the phase detector can be used in principle. Other approaches to implementing the phase detection (such as a delay line or resonator phase discrimination) can be used to eliminate the need for the high spectral purity RF source 29 as part of the phase detector.

Exemplary systems are fundamentally unaffected by RF waveguide dispersion. Because there is only one RF path, the system can run at any frequency supported by the phase detector and electro-optic modulator without adjustment of RF path lengths or phases. The photonic integrated circuit (PIC) can be modified to pass the original optical carrier on a separate output, or to combine the optical carrier and stabilized sideband on the same output.

A feedforward cancellation modulator can simultaneously be used to phase or frequency modulate the output with signals of arbitrary bandwidth without disrupting oscillation. This eliminates the need for a separate external oscillator to apply a modulation. The gain of the error correction signal can be easily adjusted to optimize the error correction at different operating frequencies ($f_{rf}$). This effect can compensate for varying modulator efficiency or photodetector or phase detector gain. Due to the feedforward architecture which is unconstrained by the signal propagation delay of the error signal, and the inherent agility of numerically controlled oscillators, the system is fundamentally able to switch operating frequency as fast as the specific phase detection approach permits. Comb based phase detectors or discriminators with periodic passbands could allow rapid switching within a range of fixed operating frequencies.

The phase detection scheme using a low phase noise VCO and a RF mixer could be replaced by interferometric frequency discrimination using optical filters or optical or electronic frequency comb sources. Other phase/frequency demodulation techniques could also be utilized for the phase detector. The optical signal could be taken off chip for phase detection with the measured phase error signal routed back to the integrated circuit. This would allow the use of bulk components for frequency error measurement which cannot be easily integrated, including high finesse optical resonators, dielectric RF resonators, optoelectronic oscillators, or optical frequency combs.

Exemplary systems can be hybrid integrated on a PIC platform and may use different materials for dielectric waveguides and delay lines (e.g., silica, silicon nitride, calcium fluoride), E-O modulators (e.g., lithium niobate, silicon, gallium arsenide), and electronic amplifiers (e.g., silicon, silcon germanium, indium phosphide). Alternately, the system could be integrated as a monolithic PIC in a III-V semiconductor process (e.g., indium phosphide) with selective area regrowth to define passive and active optical and electrical components. An optical laser source could be integrated directly or in a hybrid integration fashion to the PIC or provided externally.

Exemplary systems can provide the offset optical frequency as the single optical output. In some exemplary embodiments, it may be advantageous to provide the original optical carrier as an output. This could be done as a separate optical circuit or combined with the offset tone to produce an amplitude modulated sinewave signal. In systems where the phase detector does not provide its own low noise RF signal, it may be useful to convert the optical carrier and sideband to RF on chip to provide a separate low noise sinusoidal RF output.

In exemplary systems, the optical power splitting by a directional coupler could be replaced by using two optical sources at distinct frequencies. Both would transmit the initial modulator, but the error measurement and error correction paths would be separated by a wavelength demultiplexing filter, each using a separate optical frequency. This would allow for more optical power to be utilized in each path.

Figure 3:
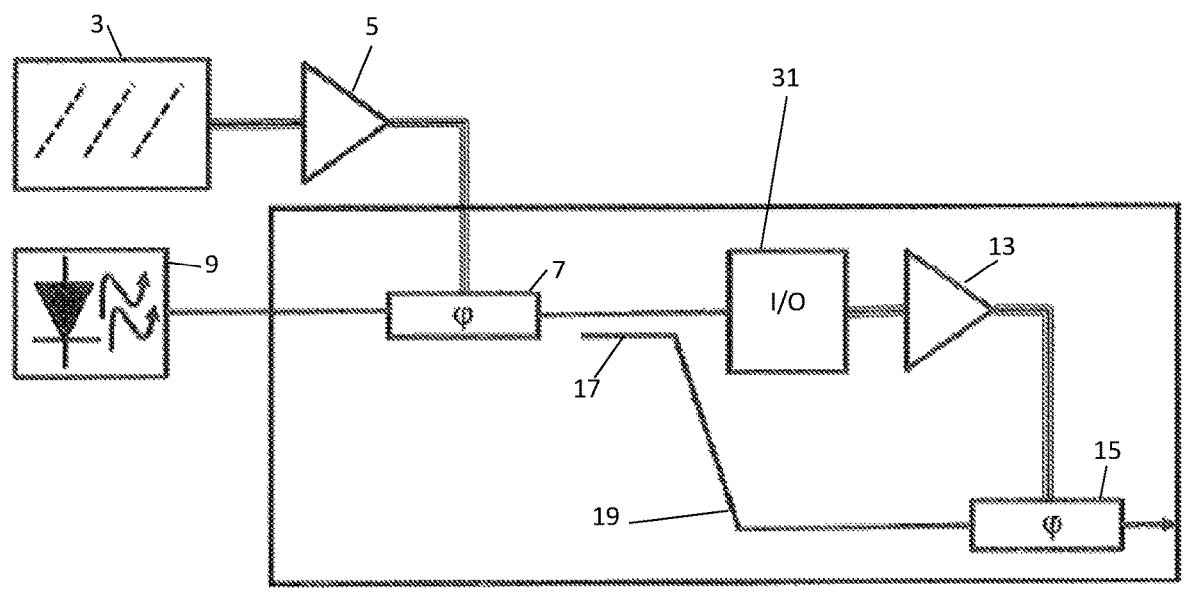
FIG. 3 shows an exemplary system architecture with an external phase detector.

FIG. 3 shows an exemplary system architecture configured for external phase detection. A RF signal generator 3 (e.g., a NCO) generates the sawtooth drive voltage with a frequency $f_{rf}$. An RF amplifier 5 amplifies the drive voltage amplitude to match the full wave voltage of an integrated first phase modulator 7. A laser source 9 provides the initial optical carrier with frequency $f_o$ that is modulated by first phase modulator 7. The modulation shifts the optical carrier frequency to $f_o+f_{rf}$ and with added phase errors due to the imperfections of the sawtooth drive. The modulated signal goes to an input/output (I/O) module 31 that sends the optical signal to an external phase detector for measurement and conversion. A baseband electrical signal with a gain of $K_{pd}$ is then transferred back to the system 1 through I/O module 31. An integrated baseband electrical amplifier 13 amplifies the signal with a gain of $-K_{bb}$. The overall gain of $-K_{bb}K_{pd}$ is designed to match the full wave voltage of a second phase modulator 15 that compensates for errors. The error signal provided to the second phase modulator creates a feedforward error compensation, ideally producing a single optical carrier shifted from the original by $f_{rf}$. A directional coupler 17 allows the optical carrier to be divided into the error measurement path and the error correction path. An optical delay line A9 is used in the correction path to delay the optical carrier and the measured error by the same amount so that they are properly synchronized at the compensating modulator. The optical signal at the output of the second phase modulator 15 is the desired single sideband shifted from the original carrier $f_{rf}$ with the phase errors of the NCO 3 suppressed by the error correction feedforward path.

FIG. 4 shows an exemplary method for producing a sideband signal. At step 401, providing a signal generator, a laser source, first and second phase modulators, a directional coupler, and a phase detector. At step 403, generating a first signal with the signal generator and a second signal with the laser source. At step 405, modulating the second signal with the first signal to generate a first modulated signal with the first phase modulator. At step 407, directing the first modulated signal to an error measurement path and an error correction path with the directional coupler. At step 409, converting the first modulated signal into a baseband electrical signal using the phase detector within the error measurement path. At step 411, modulating the baseband electrical signal with an error signal from error measurement path using the second phase modulator to output a sideband signal.

Figure 5:
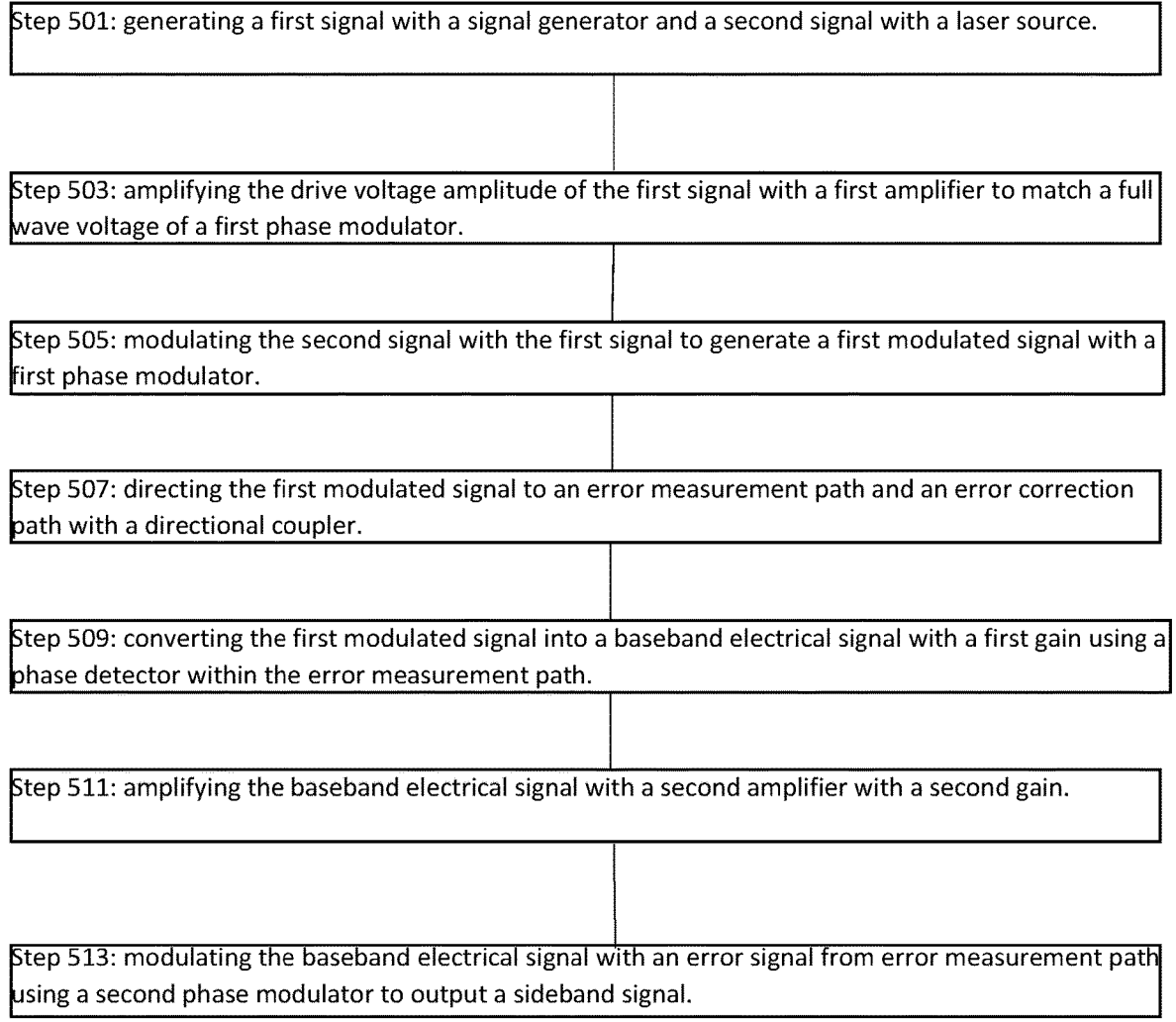
FIG. 5 shows an exemplary method for producing a sideband signal.

FIG. 5 shows an exemplary method for producing a sideband signal. At step 501, generating a first signal with a signal generator and a second signal with a laser source. At step 503, amplifying the drive voltage amplitude of the first signal with a first amplifier to match a full wave voltage of a first phase modulator. At step 505, modulating the second signal with the first signal to generate a first modulated signal with a first phase modulator. At step 507, directing the first modulated signal to an error measurement path and an error correction path with a directional coupler. At step 509, converting the first modulated signal into a baseband electrical signal using the phase detector within the error measurement path. At step 511, amplifying the baseband electrical signal with a second amplifier with a second gain. At step 513, modulating the baseband electrical signal with an error signal from error measurement path using a second phase modulator to output a sideband signal.

Although the invention has been described in detail with reference to certain preferred embodiments, variations and modifications exist within the spirit and scope of the invention as described and defined in the following claims.

The invention claimed is:

1. An optical system comprising:
a digital radio frequency (RF) signal generator configured to generate a sawtooth drive voltage signal having a first frequency;
a laser source configured to generate an optical carrier signal having a second frequency;
a first phase modulator coupled to the digital RF signal generator and coupled to the laser source, wherein the first phase modulator is configured to modulate the sawtooth drive voltage signal onto the optical carrier signal and, in response thereto, output a first modulated optical carrier signal, wherein the first modulated optical carrier signal includes one or more added phase errors due to imperfections in the sawtooth drive voltage signal;
a phase detector section coupled to receive the first modulated optical carrier signal, wherein the phase detector section is configured to:
measure the one or more added phase errors in the first modulated optical carrier signal; and
convert the first modulated optical carrier signal into a baseband electrical signal that includes feedforward compensation for the one or more added phase errors; and
a second phase modulator coupled to receive the first modulated optical carrier signal and coupled to receive the baseband electrical signal, wherein the second phase modulator is configured to modulate the baseband electrical signal onto the first modulated optical carrier signal and, in response thereto, output a second modulated optical signal, wherein the second modulated optical signal is a sideband having a frequency shifted from the second frequency of the first modulated optical carrier signal by the first frequency of the sawtooth drive voltage signal, and wherein the second phase modulator is further configured to generate the second modulated optical signal with the one or more added phase errors suppressed by the feedforward compensation of the baseband electrical signal.

2. The optical system of claim 1, further comprising a first amplifier electrically coupled between the digital RF signal generator and the first phase modulator, wherein the first amplifier is configured to amplify the sawtooth drive voltage signal to match a full wave voltage of the first phase modulator.

3. The optical system of claim 2, wherein the phase detector section further comprises:
a phase detector coupled to receive the first modulated optical carrier signal and to convert the first modulated optical carrier signal into the baseband electrical signal; and
a second amplifier electrically coupled between the phase detector and the second phase modulator, wherein the second amplifier is configured to amplify the baseband electrical signal such that a total gain of the baseband electrical signal matches a full wave voltage of the second phase modulator.

4. The optical system of claim 1, wherein the digital RF signal generator comprises a numerically controlled oscillator (NCO.

5. The optical system of claim 1, wherein the optical system is a photonics integrated circuit (PIC), and wherein the phase detector section comprises an input/output (I/O) module configured to send the first modulated optical carrier signal to an external phase detector that is external to the PIC, and to receive the baseband electrical signal from the external phase detector.

6. The optical system of claim 1, further comprising an optical delay line coupled between the first phase modulator and the second phase modulator, wherein the optical delay line is configured to delay the first modulated optical carrier signal to synchronize the first modulated optical carrier signal with the baseband electrical signal at the second phase modulator.

7. The optical system of claim 1, wherein the frequency of the sideband of the second modulated optical signal is the second frequency of the optical signal shifted upwards by an amount equal to the first frequency of the sawtooth drive signal.

8. The optical system of claim 7, wherein the sideband is a single sideband (SSB).

9. The optical system of claim 8, wherein the single sideband (SSB) is an upper sideband.

10. The optical system of claim 1, wherein the optical system includes no more than one radio frequency (RF) path, wherein the no more than one RF path consists of a signal path between the digital RF signal generator and the first phase modulator.

\* \* \* \* \*